Sept. 18, 1951  A. T. SCHEIWER  2,568,515
COMBINED NOZZLE AND COUPLING MEMBER
Filed Jan. 2, 1947  2 Sheets-Sheet 1

INVENTOR
Albert T. Scheiwer
BY
Florian G. Miller
ATTORNEY

Sept. 18, 1951  A. T. SCHEIWER  2,568,515
COMBINED NOZZLE AND COUPLING MEMBER
Filed Jan. 2, 1947  2 Sheets-Sheet 2

INVENTOR
Albert T. Scheiwer
BY
Florian D. Miller
ATTORNEY

Patented Sept. 18, 1951

2,568,515

UNITED STATES PATENT OFFICE 2,568,515

COMBINED NOZZLE AND COUPLING MEMBER

Albert T. Scheiwer, Erie, Pa.

Application January 2, 1947, Serial No. 719,686

1 Claim. (Cl. 299—150)

This invention relates generally to sprinkling devices and more particularly to a combination nozzle and connecting device for the end of a hose.

All devices of this character, made in accordance with the teachings of the prior art, and with which I am familiar, have provided separately a hose nozzle for directing the flow of fluid and a conventional apertured circular shaped lawn sprinkling member for disposal on a lawn or the like for distributing the water over a considerable area of ground. It has been found that there is very little control of the water passing from the circular sprinklers and usually there is too much water emitted, thereby resulting in the flooding out of grass and other seeds, knocking off delicate petals of flowers and other plants, especially in greenhouses and nurseries where many delicate plants are growing. These circular sprinklers as now provided cannot be used in many instances because there is too great of an amount of water which passes from the sprinkler to the ground. No suitable adjustable means has heretofore been provided at the sprinkler or near thereto to adjust the amount of flow of the water from the conventional circular shaped sprinkler. No nozzle has heretofore been provided having means for adjusting the flow of water therethrough, means for emitting the water in the form of a cone, and means for vaporizing the water through a swirling of the water in the nozzle, and further means for connecting the nozzle to a circular shaped sprinkler at a remote point from the source of supply or to a fitting in the garden remote from the source of supply.

It is, accordingly, an object of my invention to provide a combined nozzle and adjustable means therein adapted to be directly connected to a circular shaped sprinkler or the like which is simple in construction, economical in cost, efficient in operation, and economical in manufacture.

Another object of my invention is to provide a novel nozzle with a male connecting portion of a coupling formed on the end thereof adapted for direct connection to a female snap coupling member.

Another object of my invention is to provide a nozzle having means for controlling the flow of water therethrough to a circular shaped sprinkling member or the like to cause the water emitted from the circular shaped sprinkling member to be in the form of a vapor or mist.

Another object of my invention is to provide a novel construction of a nozzle wherein the flow therefrom can be regulated.

Other objects of my invention will become evident from the following detailed description, taken in conjunction with the accompanying drawings, in which Fig. 1 is a side elevational view of my combined nozzle and male connecting member;

Figure 2:
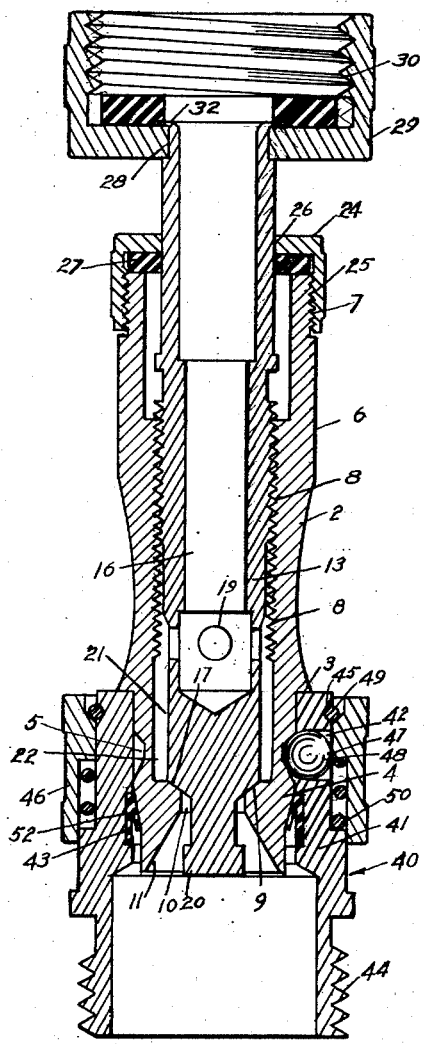
Fig. 2 is a view taken on the line 2—2 of Fig. 1.
Figure 1:
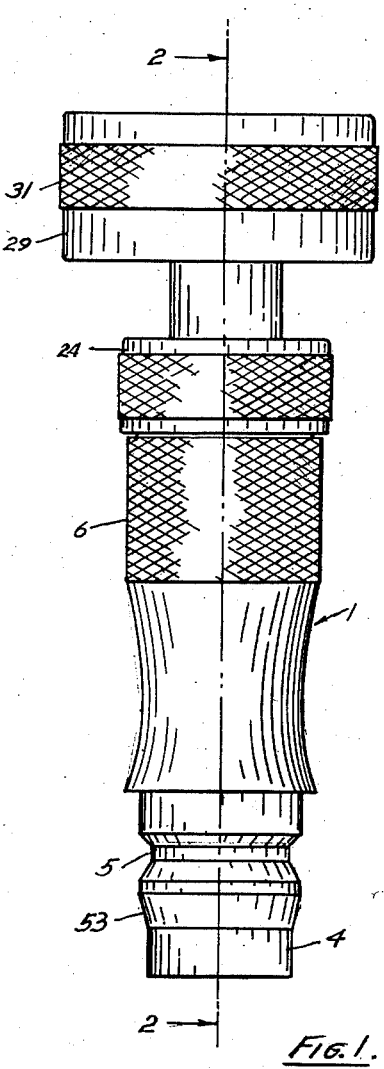
Figures 4, 5:
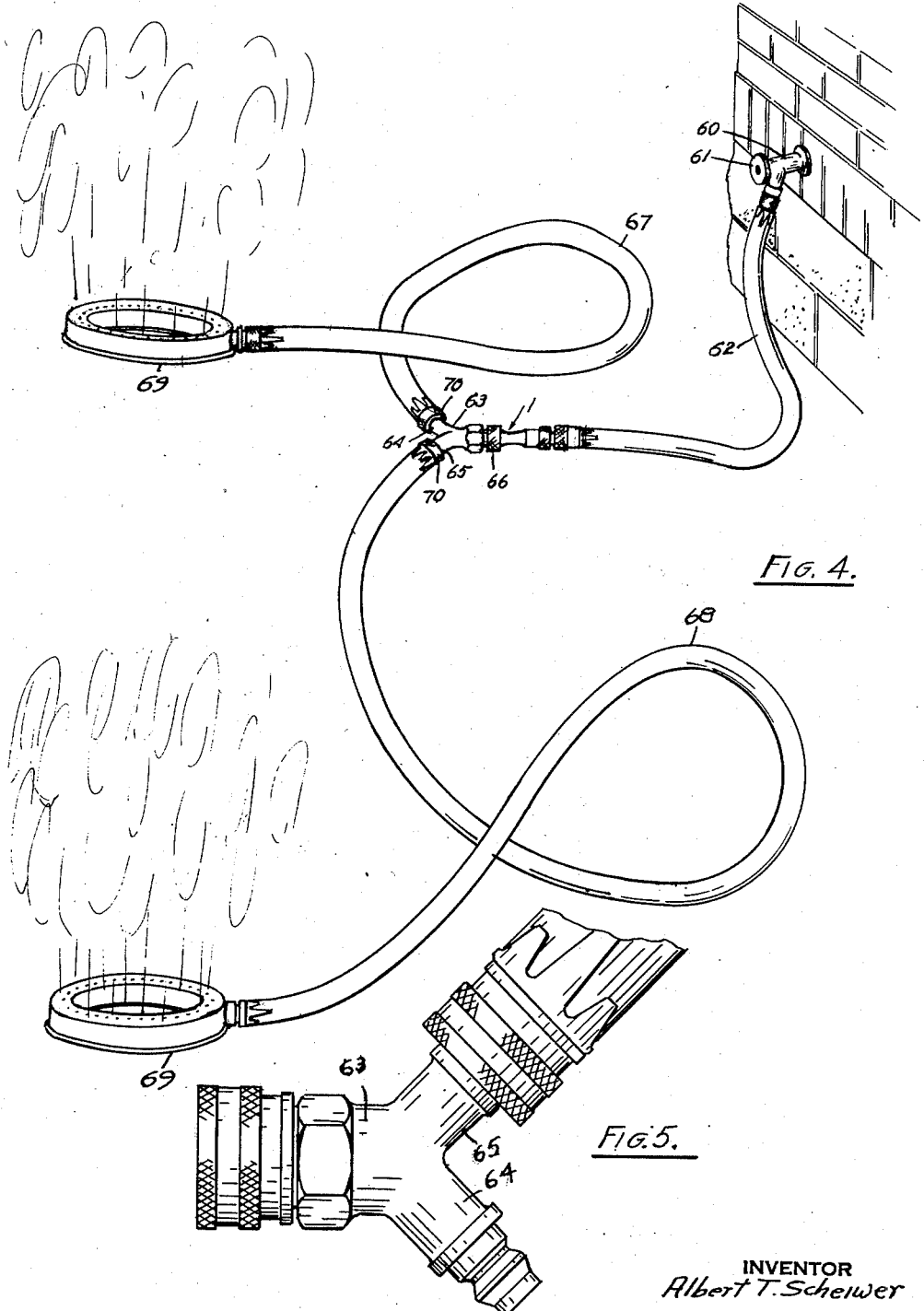
Fig. 4 is a diagrammatic view showing my novel combination nozzle and male connecting member for a coupling attached to a Y-connection for regulating the water passing to circular shaped sprinklers.
Fig. 5 is a side elevational view of a Y-connection for use with my novel combined nozzle and connecting member.

Referring now to the drawings, Figs. 1 and 2 show a nozzle member 1 comprising a generally tubular shaped member 2 having a shoulder 3, a connecting portion 4 having a peripheral groove 5, a knurled portion 6 and an externally threaded portion 7. Internally of the tubular member 2, it is threaded at 8, has a seating portion 9, a reduced aperture 10, and a flared out tapered portion 11 in the outer end thereof. A valve member 13 of cylindrical shape has a bore 16 extending longitudinally thereof, a seating portion 17 adapted to sealingly engage the seat 9 in the tubular member 2, a threaded portion 18 for threadably engaging the internally threaded portion 8 of the tubular member 2, radially extending apertures 19 leading from the bore 16 to the outer side of the valve member 13, and an outwardly extending headed portion 20 on the end of said tubular member 13 adapted to move in the reduced aperture 10 of the tubular aperture 2 to control the flow of water through the nozzle and cause the water to be thrown outwardly along the flared portion 11 of the tubular member 2 to cause the water to move from the nozzle in substantially conical shape. It will be evident that the further towards the aperture 10 that the enlarged head 20 moves, the water will tend to move and pass from the end of the nozzle with the base of the cone formed by the water becoming less and less as the headed end 20 moves into the aperture 10 and when it reaches the aperture 10, the water passes from the nozzle in substantially a straight line. The valve member 13 is reduced at 21 to form a small annular swirling chamber 22 between the valve member 13 and the inner side of the tubular member 2. A cap member 24 has internal threads 25 for threadably engaging the threaded end 7 of the tubular member 2, the valve member 13 passing through the aperture 26 in the cap member 24 and is sealingly engaged by washer 27 disposed between the cap member 24 and the end of the tubular member 2. Cut-away portion 28 on the end of the valve member 13 receives the apertured cup-shaped female connecting member 29 having internal threads 30 and a knurled outer portion 31. The female connecting member 29 is connected to the end of the valve member 13 by peening over the outer ends 32 of the valve member 13.

Attached to the male connecting portion 4 of the tubular member 2, I show a conventional female snap connecting coupling member 40 comprising an inner sleeve 41 having radially extending ball-retaining apertures 42, a washer groove 43, an external threaded portion 44 and a clip retaining groove 45. A telescoping locking sleeve 46 moves over the ball retaining apertures 42 of the sleeve 41 and has a camming portion 47 for holding the balls 48 disposed in the ball-retaining apertures 42 in locking engagement with the peripheral groove 5 in the connecting portion 4 of the tubular member 2 of the nozzle member 1. A spring clip 49 is disposed in the groove 45 of the sleeve 41 to limit the movement of the locking sleeve 46. Spring member 50 urges the locking sleeve 46 to locking engagement with the ball members 48 and against the stop clip 49. A substantially V-shaped washer 52 is disposed in the groove 43 of the tubular member 1 to sealingly engage the tapered portion 53 of the connecting portion 4 of the tubular member 2 of the nozzle member 1.

Figure 3:
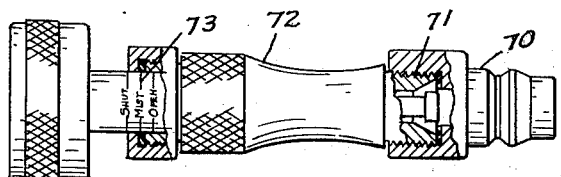
Fig. 3 is a side elevational view of a modified form of combined nozzle and connecting member.

In operation, the female connecting member 29 is attached to the end of a hose and the other end of the hose is attached to a faucet 60 as shown in Fig. 3. The valve member 13 has the seat 17 thereof in seating engagement with the seat 9 in the tubular member 2 as shown in Fig. 2 when the handle 61 of the faucet is turned to permit the flow of fluid in the hose 62. The tubular member 2 or valve member 13 is then rotated until the seating portion 17 of the ball member 13 moves away from the seat 9 of the tubular member 2 and water flows out of the end of the nozzle for general sprinkling purposes. By moving the headed end 20 of the valve member 13 rearwardly, the flow of water is adjusted to make any spread desired inasmuch as the water tends to conform to the angle of the conical shaped flared portion 11 of the tubular member 2 to form a conical shape when leaving the end of the nozzle member 1. The water is swirled in chamber 22 in order that a vapor or mist spray may be provided if desired. When the nozzle has served its purpose for direct sprinkling, the valve member 13 or the tubular member 2 is rotated so that the seating portion 17 of the valve member 13 seats on the seat 9 of the tubular member 2 to close off the flow of water. The connecting portion 4 of the tubular member 2 of the nozzle member 1 is then connected to a conventional female coupling member as shown in Fig. 2 and which is also shown in Fig. 3. A conventional female coupling member 66 of a snap-tight coupling may be disposed on a Y-fitting 63 as shown in Fig. 3 with male connecting portions 64 and 65 on the other two branch lines. The branches of the Y-fitting 63 may have connected thereto conventional hose lines 67 and 68 having conventional snap-tight fittings for connection to conventional ring shaped sprinklers 69. It will be evident that the nozzle member 1 may be connected directly to the female coupling members 70 on the ends of the hose lines 67 and 68 individually or it may be connected directly to a female connecting member on one of the cylindrical shaped lawn sprinklers 69. It has heretofore been necessary to kink the hose or go back to the house to shut off the water in the hose line in order to make a connection between the end of the sprinkling hose and a lawn sprinkler after the nozzle is unscrewed from the end of the hose. Hoses were quickly ruined by these previous methods and my device completely eliminates the kinking of the hose and unscrewing of the nozzle and also provides adjusting means at the outer end of the hose to adjust the amount of water being emitted from the lawn sprinkler or sprinklers. By utilizing a nozzle member of my novel design in the hose line leading to a ring sprinkler, a vapor or mist spray may be provided by adjustment of the nozzle, thereby eliminating any chances of washing out seeds or knocking the petals from delicate flowers or plants.

In Fig. 3, I have shown male connecting member 70 threadably engaged to the threaded portion 71 of a nozzle 72 of the type shown in Figs. 1 and 2. I have also shown indicating lines 73 which are adaptable for use with my novel combined nozzle and connecting member.

It will be noted that the seat 9 and the seating portion 17 of the valve member 13 are both metal and therefore there is metal to metal contact which therefore provides a sealed valve connection for any fluid line no matter what the temperature or what the chemical composition. The washer 27 may be replaced by a lead or any other composition washer which is resistant to chemicals or heat.

It will be evident from the foregoing that I have provided a novel combination nozzle connecting member and adjusting means therefor for varying the spread of the water when sprinkling directly from the nozzle and one which has a connecting portion which may be directly connected to the female member of a ball type coupling.

Various changes may be made in the specific embodiment of my invention without departing from the spirit thereof or from the scope of the appended claim.

What I claim is:

A combined adjustable nozzle and coupling member comprising a cylindrical member having a reduced portion terminating in an outwardly flared portion in the open end thereof, an annular groove adjacent said reduced portion, an internally threaded portion, and an outer peripheral groove spaced a predetermined distance from the end of said nozzle on the outer periphery thereof for connection by the cams of a female coupling member; a threaded member threadably engaging the internally threaded portion of said cylindrical member having a longitudinally extending aperture terminating in laterally extending apertures leading to said grooved portion of said cylindrical member, said internal member and said grooved portion of said cylindrical member defining an annular swirling chamber; a seat on said internal member; and a headed portion on the end thereof for opening and closing the reduced portion in the end of said cylindrical member; and a hose connection on the end of said internal member opposite to the end thereof having said seat, said cylindrical member being longitudinally movable by rotation thereof on said internal member to control the flow of fluid through the reduced opening in said cylindrical member.

ALBERT T. SCHEIWER.

REFERENCES CITED

The following references are of record in the file of this patent:

UNITED STATES PATENTS

| Number | Name | Date |
|---|---|---|
| 155,268 | Stocker et al. | Sept. 22, 1874 |
| 1,046,285 | Fischel | Dec. 3, 1912 |
| 1,193,011 | Gibbs | Aug. 1, 1916 |
| 1,215,796 | Gibbs | Feb. 13, 1917 |
| 1,752,193 | O'Hanlon | Mar. 25, 1930 |
| 2,028,555 | McDowell et al. | Jan. 21, 1936 |
| 2,121,741 | Lusher et al. | June 21, 1938 |
| 2,135,223 | Scheiwer | Nov. 1, 1938 |
| 2,141,868 | Kenney | Dec. 27, 1938 |
| 2,144,619 | Corley | Jan. 24, 1939 |
| 2,322,877 | Parker | June 29, 1943 |
| 2,394,236 | Eastman | Feb. 5, 1946 |
| 2,433,119 | Hansen | Dec. 23, 1947 |
| 2,474,332 | Sciuto | June 28, 1949 |